United States Patent [19]

Masaki et al.

[11] Patent Number: 4,670,852

[45] Date of Patent: Jun. 2, 1987

[54] WHEEL SPEED AND ACCELERATION DETECTION IMMUNE TO DISTURBANCE

[75] Inventors: Shouichi Masaki; Kimio Tamura, both of Anjo; Noriyuki Nakashima, Nagoya; Teruyoshi Wakao, Nagoya; Ken Asami, Nagoya; Kazunori Sakai, Nagoya, all of Japan

[73] Assignees: Nippondenso Co., Ltd., Kariya; Toyota Jidosha Kabushiki Kaisha, Toyota, both of Japan

[21] Appl. No.: 632,657

[22] Filed: Jul. 20, 1984

[30] Foreign Application Priority Data

Jul. 20, 1983 [JP] Japan ............... 58-132089

[51] Int. Cl.⁴ .................. G01P 11/00; G01P 15/00
[52] U.S. Cl. ............... 364/565; 364/566; 364/575; 364/426; 324/161; 324/166
[58] Field of Search ........... 364/426, 565, 566, 575; 324/160–162, 166; 303/93, 95, 108; 361/238

[56] References Cited

U.S. PATENT DOCUMENTS

| | | | |
|---|---|---|---|
| 4,151,466 | 4/1979 | Boyer et al. | 324/160 |
| 4,281,388 | 7/1981 | Friend et al. | 364/565 |
| 4,368,426 | 1/1983 | Hayashi et al. | 364/565 |
| 4,398,260 | 8/1983 | Takahashi et al. | 364/426 |
| 4,420,814 | 12/1983 | Arikawa et al. | 364/426 |
| 4,430,703 | 2/1984 | Saumweber et al. | 364/426 |
| 4,468,740 | 8/1984 | Beck et al. | 364/426 |
| 4,497,026 | 1/1985 | Braschel et al. | 364/426 |
| 4,506,216 | 3/1985 | Fukamachi et al. | 324/161 |
| 4,517,647 | 5/1985 | Harada et al. | 303/108 |

*Primary Examiner*—Gary Chin
*Attorney, Agent, or Firm*—Cushman, Darby & Cushman

[57] ABSTRACT

A pulse signal is generated by a wheel speed sensor with a frequency proportional to the speed of rotation of a vehicle wheel, the pulse signal comprising a plurality of frames each having a series of a predetermined number of pulses which are tended to be affected by noise and pulse mutilation. Pulses in each frame are counted and from the count is derived an instantaneous wheel speed value. The difference between the successively derived instantaneous speed values is taken and compared with a predetermined threshold. A first or a second indication is given in response to the difference being lower or higher than the threshold, respectively. If the first indication is given, output signals representing the average wheel speed and average wheel acceleration of the wheel are derived from the instantaneous speed values of successive frames. If the second indication is given, the instantaneous speed value of the previous frame is used instead of the instantaneous value of the subsequent frame which is disturbed by noise or pulse mutilation to derive the output signals.

4 Claims, 21 Drawing Figures

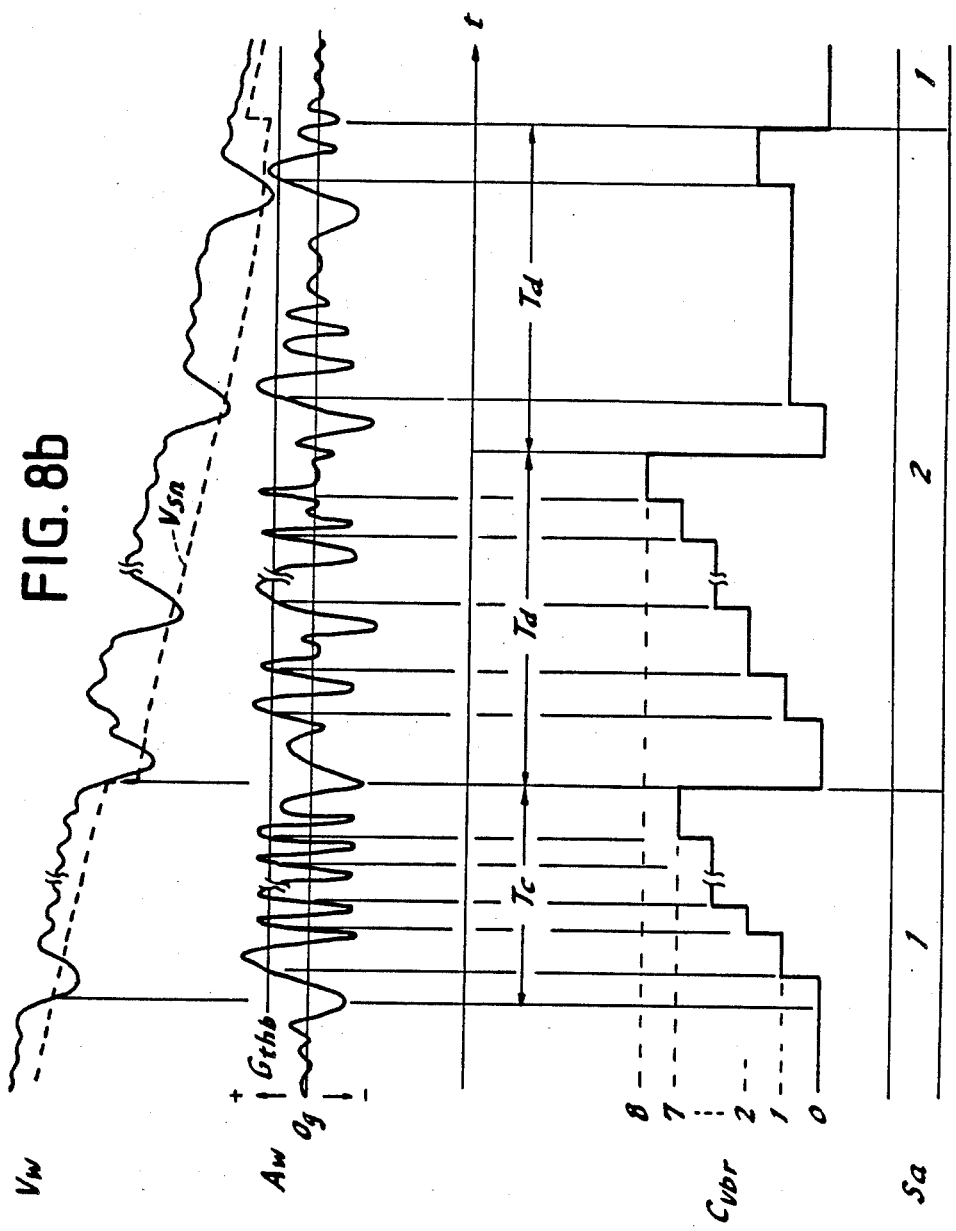

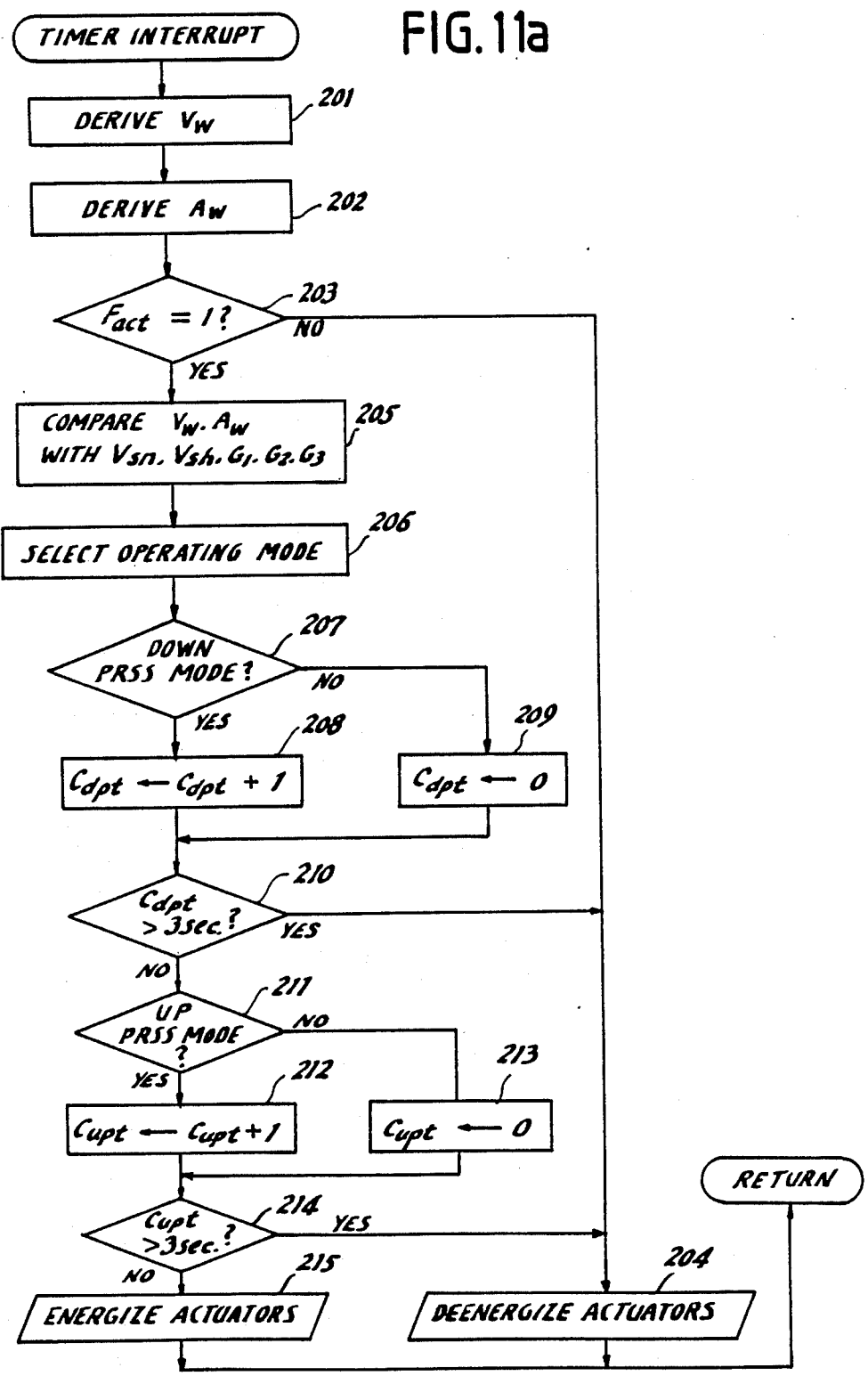

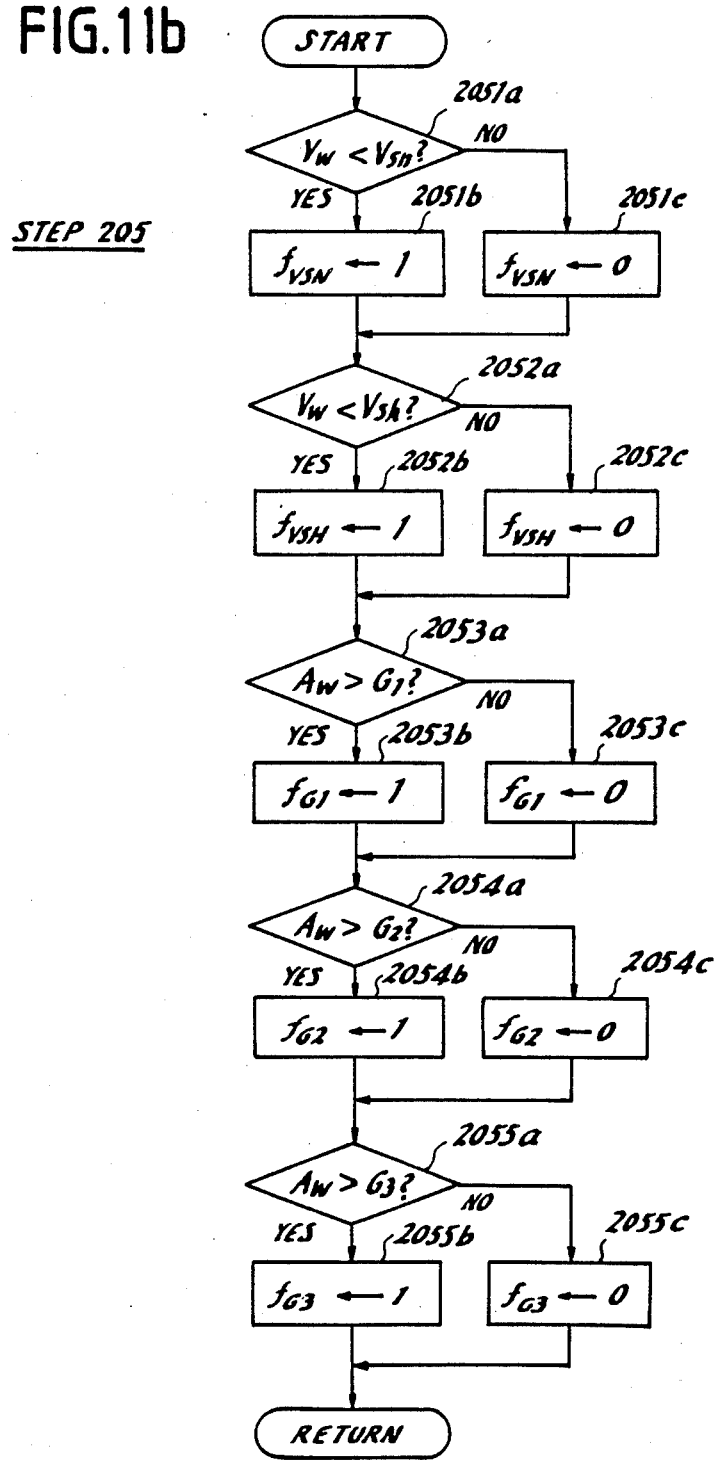

FIG.12

| MODE | $f_{VSN}$ | $f_{VSH}$ | $f_{G3}$ | $f_{G2}$ | $f_{G1}$ | PRESSURE GRADIENT |
|---|---|---|---|---|---|---|
| I | 0 | 0 | 0 | 0 | 0 | |
| II | 0 | 0 | 0 | 0 | 1 | ↙ |
| III | 0 | 0 | 0 | 1 | 1 | |
| IV | 0 | 0 | 1 | 1 | 1 | ↙ ↗ |
| V | 1 | 0 | 0 | 0 | 0 | ↖ |
| VI | 1 | 0 | 0 | 0 | 1 | ↖ ↘ |
| VII | 1 | 0 | 0 | 1 | 1 | ↙ ↘ |
| VIII | 1 | 1 | 1 | 1 | 1 | |
| IX | 1 | 1 | 0 | 0 | 0 | ↗ |
| X | 1 | 1 | 0 | 0 | 1 | ↖ ↗ |
| XI | 1 | 1 | 0 | 1 | 1 | |
| XII | 1 | 1 | 1 | 1 | 1 | ↖ |

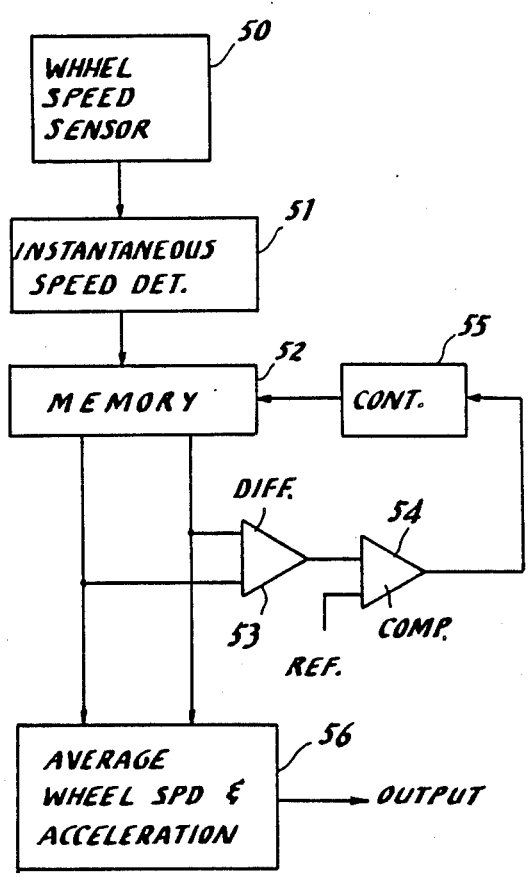

WHEEL SPEED AND ACCELERATION DETECTION IMMUNE TO DISTURBANCE

BACKGROUND OF THE INVENTION

The present invention relates to the detection of wheel-speed and wheel-acceleration that is immune to noise and pulse mutilation. The invention is particularly useful for application to antiskid control systems.

In antiskid control systems, the pulse signal from a wheel speed sensor is processed to derive an average wheel speed value for estimating the vehicle speed and deriving therefrom reference speed and acceleration values for effecting up and down brake pressure variation in order for the system to operate appropriately under all surface conditions.

It is essential that the derived wheel speed value be a true indication of the actual speed. However, due to rigorous operating conditions and noisy environment, pulse signals generated by the sensors are affected by noise and pulse mutilation, resulting in errors in antiskid control.

SUMMARY OF THE INVENTION

Accordingly, the present invention provides a wheel speed and acceleration detector which is immune to such disturbances.

According to the invention, a pulse signal is generated with a frequency proportional to the speed of rotation of a vehicle wheel, the pulse signal comprising a plurality of frames each having a series of a predetermined number of pulses which tend to be affected by noise and pulse mutilation. Pulses in each frame are counted and from the count are derived an instantaneous wheel speed value and a wheel acceleration value. The difference between the successively derived instantaneous speed values is taken and compared with a predetermined threshold. A first or a second indication is given in response to the difference being lower or higher than the threshold, respectively. If the first indication is given, output signals representing the average wheel speed and average wheel acceleration of the wheel are derived from the instantaneous speed values of successive frames. If the second indication is given, the instantaneous speed value of the previous frame is used instead of the instantaneous value of the subsequent frame which is disturbed by noise or pulse mutilation to derive the output signals.

BRIEF DESCRIPTION OF THE DRAWINGS

The present invention will be described in further detail with reference to the accompanying drawings, in which:

FIGS. 8a and 8b are graphic illustrations useful for describing the operation of the invention;

FIGS. 11a and 11b are illustrations of a flow diagram describing a timer interrupt subroutine;

FIG. 12 is an illustration of actuator operating modes;

FIG. 17 is a schematic block diagram of the wheel speed and acceleration detector of the invention.

DETAILED DESCRIPTION

For purposes of this disclosure, the wheel speed and acceleration detector of the present invention is incorporated in an antiskid control system of the type in which road surface roughness is compensated. Before describing the wheel speed detector of the invention, a description will first be provided of the antiskid control system.

Figure 1:
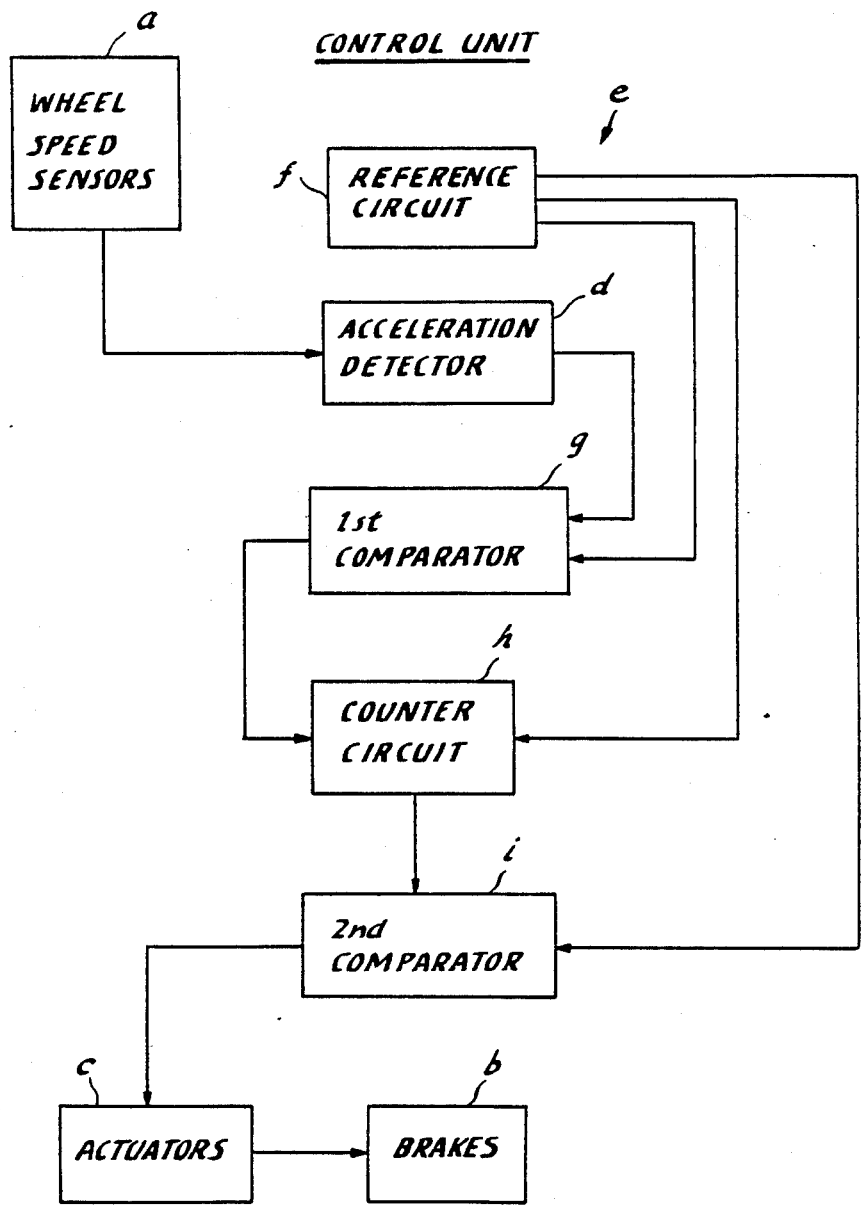
FIG. 1 is a schematic illustration of an antiskid control system incorporating the wheel acceleration detector of the invention.

The antiskid control system is represented in FIG. 1 as comprising, generally, a plurality of wheel speed sensors a, a control unit e having a wheel speed and acceleration detector d which is constructed according to the present invention. The detector d is coupled to the sensors a. A reference circuit or a memory f provides reference signals. Further included are first and second comparators g and i and a counter circuit h. The reference signals stored in memory f include an acceleration threshold against which the output of wheel speed and acceleration detector d is compared, data representing first and second periods during which the comparison is to be made and a reference count representing a predetermined road surface condition. The first comparator g compares the output of acceleration detector d with the acceleration threshold in said periods in succession. The counter h increments a count value when the threshold is exceeded during said periods. The second comparator i compares the output of counter h with the reference count to detect whether the count values in the first and second periods exceed or remain below the reference count, and controls brake pressure actuators c associated with brakes b according to the results of the comparison.

Figure 2:
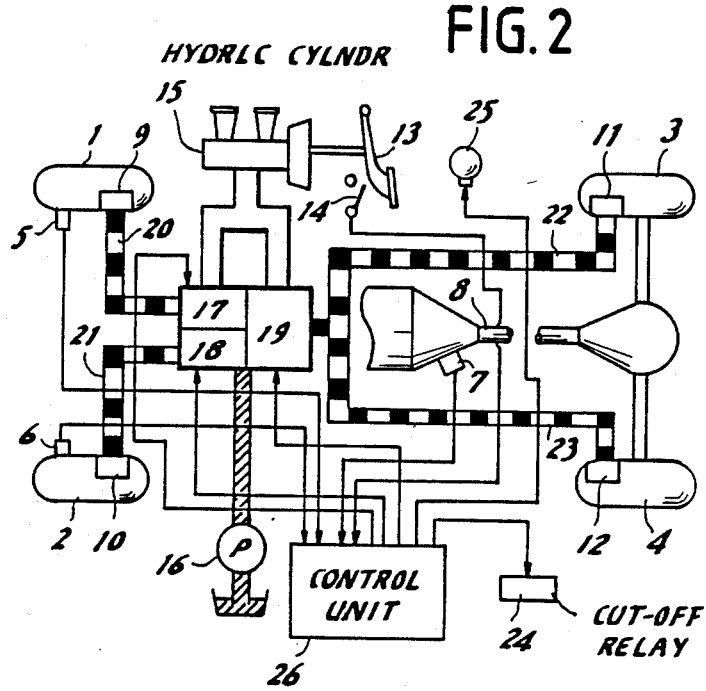
FIG. 2 is an illustration of the antiskid control mechanism.

FIG. 2 shows an antiskid control system incorporating a wheel and acceleration detector of the invention. Wheel speed sensors 5 and 6 on front-right and front-left wheels 1 and 2 provide front wheel speed signals independently to a control unit 26, and a rear wheel speed sensor 7 is located on a propeller shaft 8 that drives rear-right and rear-left wheels 3 and 4 to provide an average rear wheel speed to the control unit. Pressure control signals are supplied from control unit 26 to solenoid-operated actuators 17, 18, 19 which in turn control pressures of hydraulic brakes 9, 10, 11, 12 mounted on wheels 1, 2, 3, 4 through lines 20, 21, 22, 23, respectively. A brake-pedal ON or OFF signal is fed from stop switch 14 located in proximity to brake pedal 13 to control unit 26. A hydraulic cylinder 15 provides a brake pressure to actuators 17–19 in response to brake pedal 13 being depressed. Solenoid actuators 17–19 are supplied with a constant hydraulic pressure from a pump 16. Control signals are supplied to the actuators 17–19 through a fail-safe cut-off relay 24 from control unit 26. A warning light 25 is provided to alert vehicle passangers when disconnections have occurred in the circuits to the solenoid actuators and stop switch 14.

Figure 3:
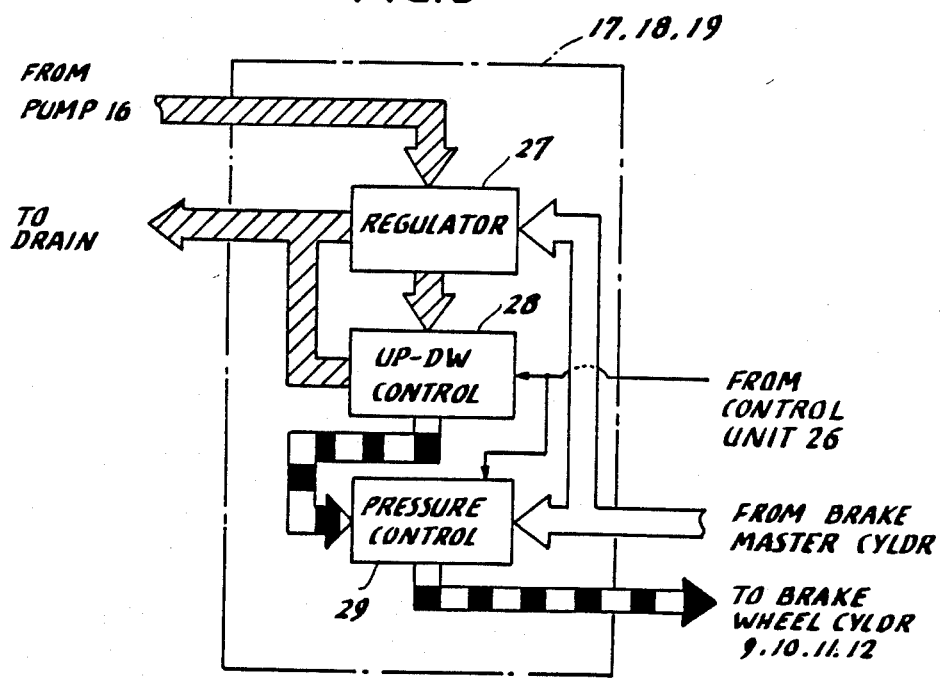
FIG. 3 is an illustration of the detail of the actuators of FIG. 2.

As illustrated in FIG. 3, each of solenoid actuators 17–19 comprises a pressure regulator 27 which is connected to pump 16 to regulate the hydraulic pressure at a constant level. A control valve unit 28 includes a switching solenoid which provides brake pressure up-down control, and a pressure control solenoid that controls the gradient of pressure applied to brakes. Further provided is a brake pressure controller 29 including a switching solenoid that provides high pressure variation when energized and low pressure variation when de-energized. The output of controller 29 is connected to the brake wheel cylinder of the associated brake.

Figure 4:
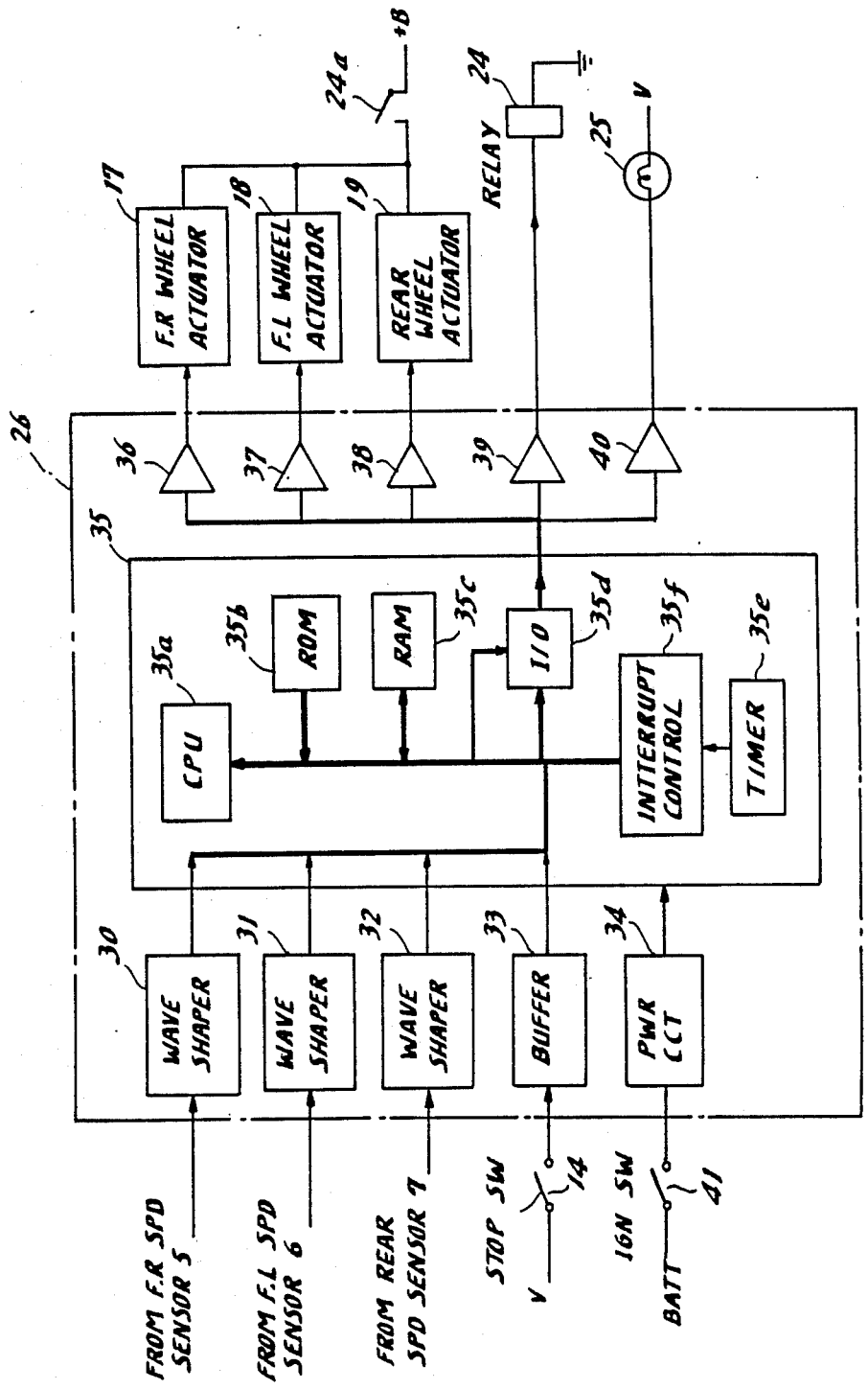
FIG. 4 is an illustration of the detail of the control unit of FIG. 2.

FIG. 4 is an illustration of the details of control unit 26. Wheel speed signals from sensors 5, 6, 7 are shaped into rectangular pulses by waveshaping circuits 30, 31, 32, and a stop signal from switch 14 is fed to a buffer 33. Microcomputer 35, which is powered by circuit 34 in response to ignition switch 41, includes a microprocessor (CPU) 35a that receives these signals through an input/output port 35d to perform operations according to programmed instructions stored in read-only memory 35b. Temporary data are stored in RAM 35c during the process of input data which will be described in detail later. Brake control signals from microcomputer 35 are fed through drivers 36, 37, 38 to solenoid-operated actuators 17, 18, 19, respectively, which are connected in circuit with the relay contacts 24a of cut-off relay 24 which is energized by a driver 39. Driver 40 energizes warning light 25 under control of microcomputer 35. A timer 35e provides a timing pulse at regular intervals to an interrupt control unit 35f which in response to the timing pulse issues an interrupt command to microprocessor 35a. As will be described later, the microprocessor interrupts its main routine execution to execute a timer interrupt subroutine in which it selects an appropriate brake pressure gradient pattern and operates the actuators 17–19.

When ignition switch 41 is turned on, microcomputer 35 initiates executing instructions stored in ROM 35b. The program shown in FIG. 5 starts with a block 101 where various temporary data such as flags are initialized. Control is passed to a subroutine 102 in which antiskid control go-ahead decisions and start timing decisions are made. As shown in FIG. 6, subroutine 102 comprises three successive steps 1021 to 1023 for making decisions by proceeding with a block 1021 in which the microcomputer checks if the antiskid system is functioning properly. In block 1022, vehicle speed Vsb is compared with a reference speed (5 km/h, for example) to detect if the vehicle is higher than the reference speed, and in block 1023 the ON-state of stop switch 14 is detected. If these decisions are all affirmative, control is passed to a block 1024 to set go-ahead flag $F_{act}$ and if any one of these decisions is negative, control is passed to blocks 1025 and 1028 in succession to reset go-ahead flag $F_{act}$ and control start flag $F_{sta}$, respectively. Block 1026 is then executed to detect if any one of sensed wheel speed values Vw is lower than a reference speed Vss which represents the upper limit for effecting antiskid control. Control is passed to block 1027 to set control start flag $F_{sta}$ if the speed value Vw becomes lower than reference speed Vss.

Figure 7A:
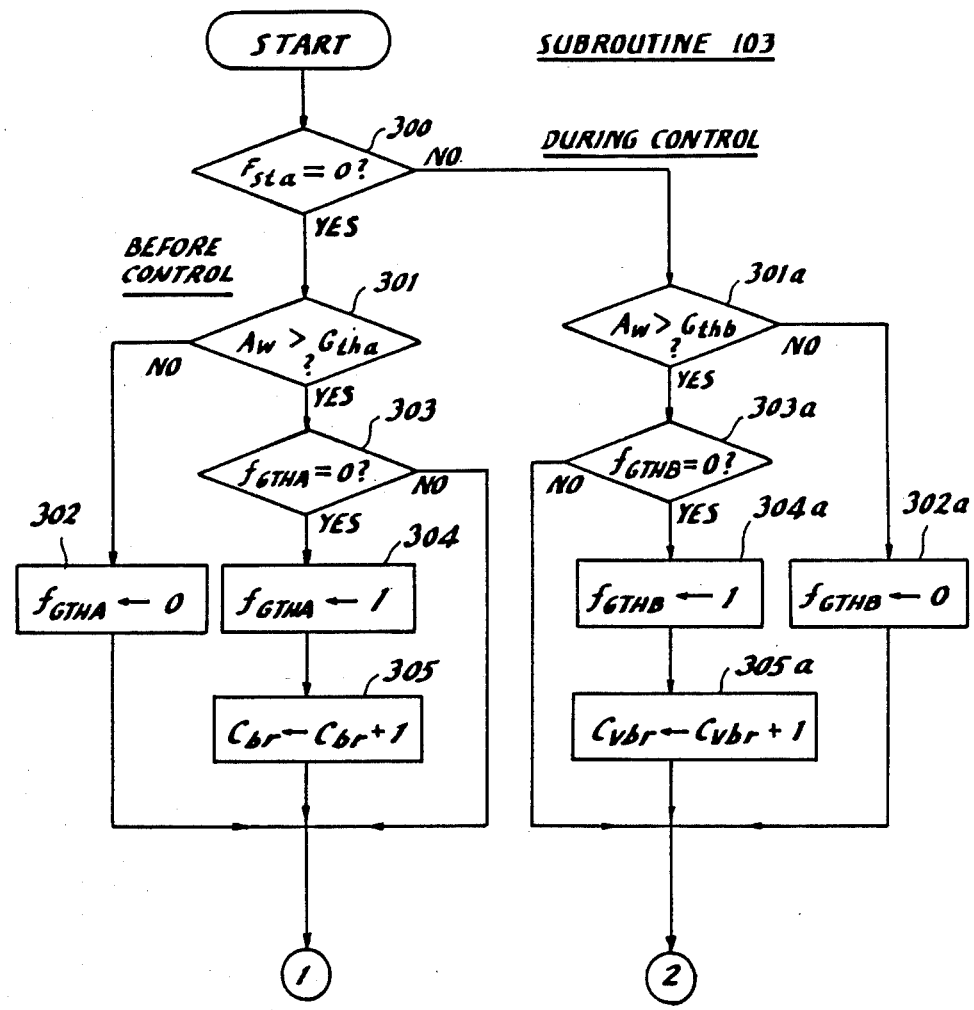
FIGS. 7a–7c are illustrations of a flow diagram describing the surface conditions determination subroutine of FIG. 5.
Figure 7B:
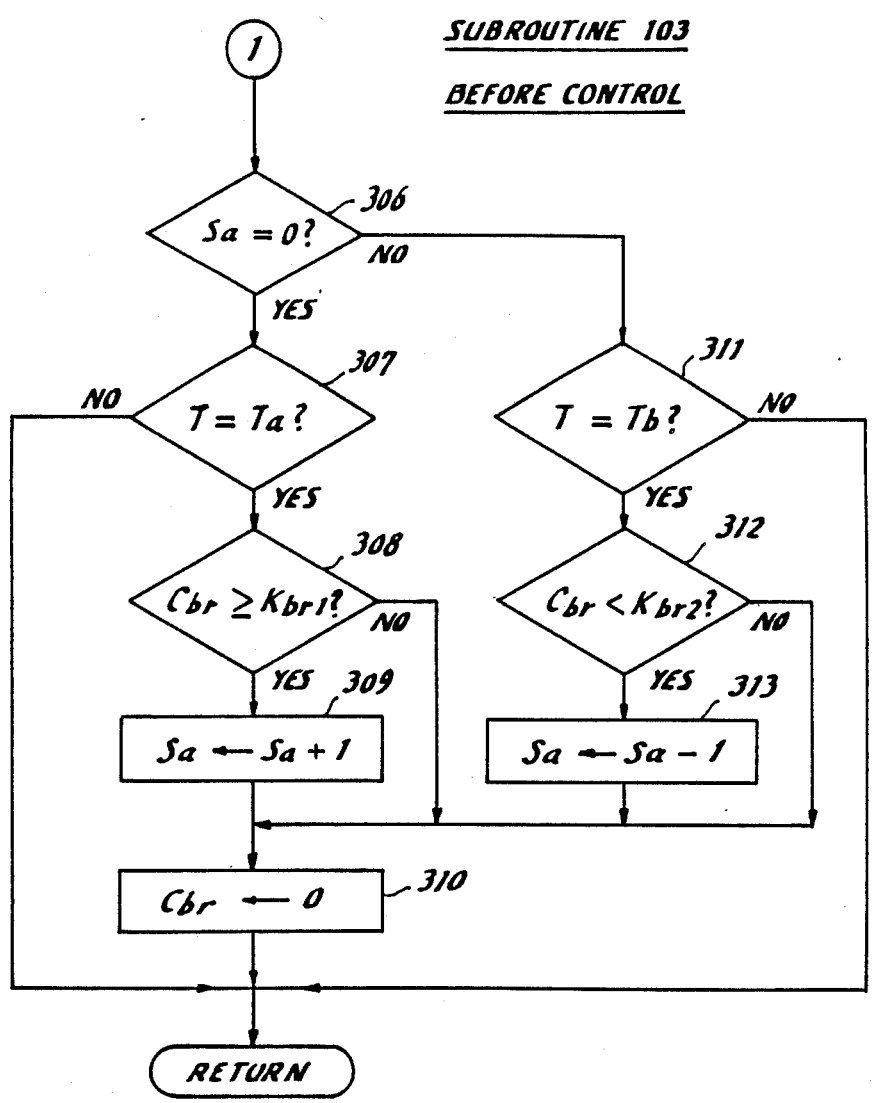
Figure 7C:
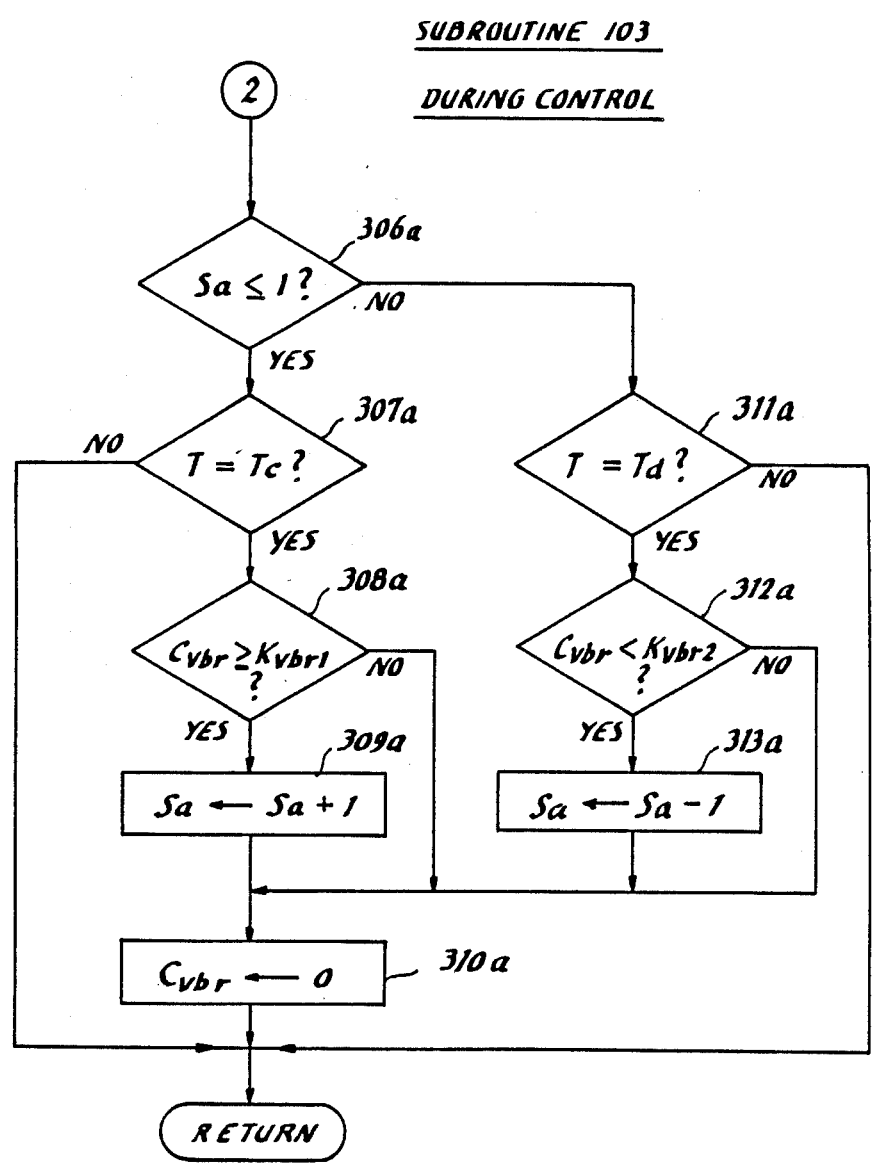

The microcomputer then advances to a subroutine 103 to estimate road surface conditions including types of road, road friction and surface irregularities. FIGS. 7a to 7c illustrate the steps necessary to obtain such information before and during antiskid control using data representing reference wheel speed and wheel acceleration stored in ROM 35b. In FIG. 7a, the subroutine 103 starts with a decision step 300 in which the microprocessor determines if the process is being carried out before or during antiskid control by checking start flag $F_{sta}$. If $F_{sta}=0$, indicating that antiskid control is not yet started, control is passed to block 301 to check if the actual acceleration Aw of each wheel is greater than the reference value of wheel acceleration $G_{tha}$ (which is typically +2.0 g) and if not, acceleration exceedance flag $f_{GTHA}$ is reset in block 302 and if so, control is passed to block 303 to check if this flag $f_{GTHA}=0$ indicating that the actual acceleration Aw has just exceeded reference $G_{tha}$ in the current execution. If so, control is passed to blocks 304 and 305 to set up flag $f_{GTHA}$ and increment acceleration exceedance counter Cbr by one.

If antiskid control is being effected, control exits from block 300 to a sequence of blocks 301a to 305a corresponding to blocks 301 to 305. In block 301a actual acceleration value Aw is compared with a reference wheel acceleration $G_{thb}$ and if Aw is smaller than $G_{thb}$ (+4 g), acceleration exceedance flag $f_{GTHB}$ is reset in block 302a, and if Aw is greater than $G_{thb}$, control is passed through blocks 303a, 304a and 305a to set up flag $f_{GTHA}$ and increment acceleration exceedance counter Cvbr if the accleration value has just exceeded the reference $G_{thb}$ in the current execution.

If wheel acceleration has fallen below the reference value in either prior to or during control, acceleration exceedance flag $f_{GTHA}$ or $f_{GTHB}$ will be reset. Therefore, the instances of acceleration exceedance are counted by respective counters Cbr and Cvbr.

If antiskid control is not yet effected, block 305 is followed by a sequence of steps shown in FIG. 7b and if antiskid control is being effected, block 305a is followed by a sequence of steps shown in FIG. 7c.

According to the invention, road surface roughness is determined on the basis of four references: $Kbr_2$ representing a smooth surface, $Kbr_1$ representing a low degree of roughness, $Kvbr_1$ representing a high degree of roughness, and $Kvbr_2$ representing a surface which falls in a range between smooth and a low degree of roughness. Acceleration exceedance count values Cbr and Cvbr are compared with these references during corresponding periods Tb, Ta, Tc and Td.

In FIG. 7b, surface roughness indicator counter Sa is interrogated in block 306. If Sa=0 indicating that the road is smooth, block 307 is executed by detecting when the timer counter T has reached a specified count value representing the period Ta, typically 0.25 seconds, for detecting low degree roughness conditions. If T=Ta, control is passed to block 308 to check if the acceleration exceedance counter Cbr of each wheel has reached a count value equal to or greater than smooth road reference value $Kbr_1$ which represents the low degree of roughness. A suitable value for the reference $Kbr_1$ is 2.

As long as the count Cbr is smaller than low-degree roughness reference $Kbr_1$ during period Ta, the road condition is interpreted as smooth and all wheel acceleration exceedance counters Cbr are reset to zero in block 310. If $Kbr_1$ is exceeded during period Ta, control is passed to block 309 to increment roughness indicator Sa to 1 indicating that a road surface having a low-degree of roughness is encountered.

The microprocessor will proceed to block 311 in the next execution to check if the timer counter T has reached a count equal to period Tb, typically one second, for detecting a smooth road condition. At T=Tb, acceleration exceedance counter Cbr is checked in block 312 against smooth surface reference value $Kbr_2$ (=3). If Cbr becomes smaller than $Kbr_2$, roughness indicator counter Sa is decremented to 0 in block 313 to give an indication that the vehicle is running on a smooth surface.

In this way, control is passed to block 307 to check for a low degree rough road if a smooth road indication was given in the previous execution, and control is passed to block 311 to check for a smooth road if a low degree rough road indication was given in the previous execution.

Figure 8A:
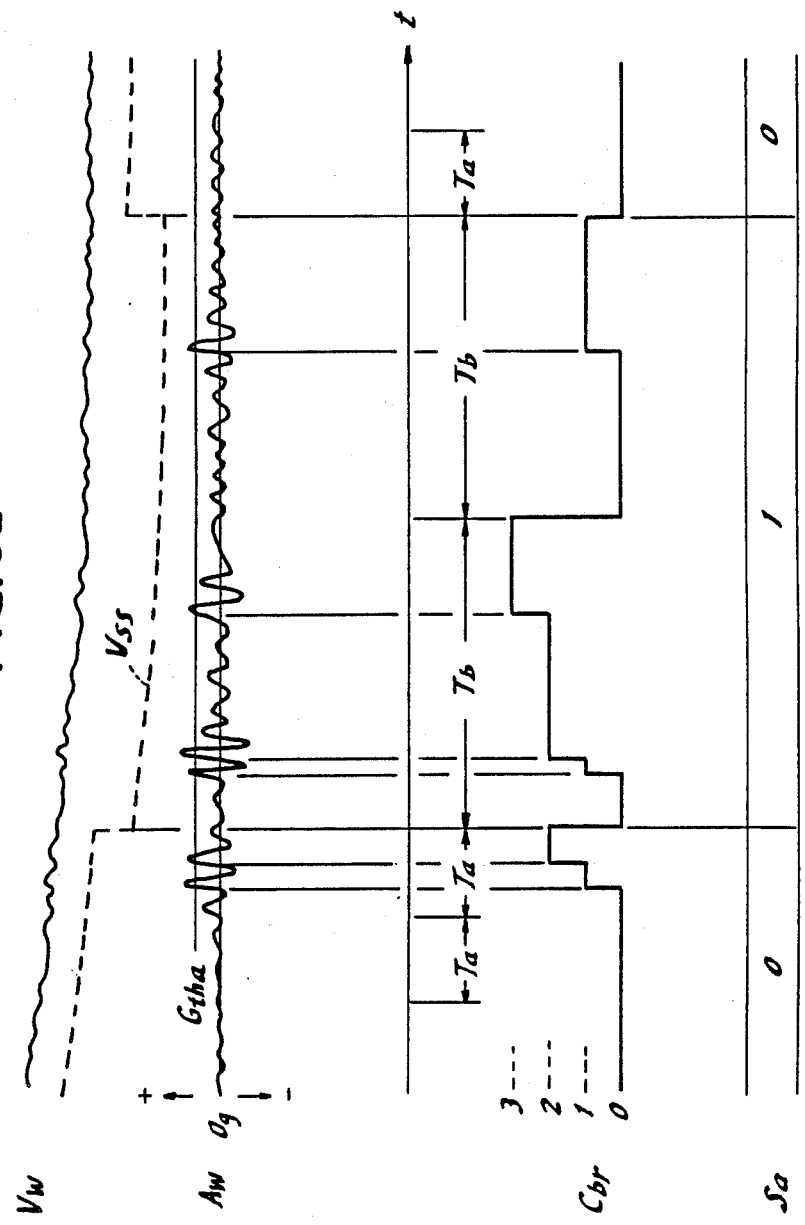

Let it be assumed that during coasting or pre-antiskid control, wheel speed Vw is steadily on the decrease as shown in FIG. 8a, and acceleration Aw fluctuates above and below the reference Gtha. The acceleration exceedance count Cbr increases in a stepwise fashion from 0 to 2 during period Ta of second occurrence and roughness indicator count Sa is incremented to 1 as the microprocessor executes blocks 307 to 310. With the roughness indicator Sa being switched to 1, decision time period T is switched from Ta to Tb. Upon first occurrence of coincidence between T and Tb, acceleration exceedance counter Cbr is checked against $Kbr_2$ (=3) and control takes a "no" decision route from block 312 to block 310. Upon a second occurrence of coincidence between T and Tb, Cbr is checked again with $Kbr_2$ and this time the former becomes smaller than the latter and control is passed to block 313 to decrement roughness indicator Sa to 0. Thus, during pre-antiskid control, roughness indicator counter Sa varies between 0 and 1.

The flow diagram shown in FIG. 7c, which is similar to that shown in FIG. 7b, will be executed if start flag $F_{sta}$ is detected in block 300, FIG. 7a. In FIG. 7c, the roughness indicator is interrogated in block 306a. Since the roughness indication stored in counter Sa during a pre-antiskid control period is either 1 (=low-degree roughness) or 0 (=smooth), control is passed to block 307a to check if the timer counter value T has exceeded a threshold corresponding to period Tc (=0.5 seconds). Upon coincidence between T=Tc in block 307a, acceleration exceedance counter $Cvbr_1$ is checked in block 308a against the high degree roughness reference $Kvbr_1$ (=7).

FIG. 8b shows wheel acceleration during antiskid control in which wheel acceleration is compared with high reference Gthb (=+4 g). The acceleration exceedance counter Cvbr exceeds $Kvbr_1$ at time T=Tc and roughness indicator counter Sa is incremented to 2 (block 309a), with the Cvbr counter being reset to zero in block 310a.

With Sa being switched to 2 (=high-degree roughness), the microprocessor proceeds to block 311a in the next execution. Count Cvbr is compared with smooth-or-low degree roughness reference $Kvbr_2$ (=8) in block 312a at time T=Td (=1 second). If the latter is exceeded upon the occurrence of first coincidence between T and Td, the Cvbr counter is reset to zero. This counter remains at a level below the reference $Kvbr_2$ upon second coincidence between T and Td, whereupon roughness indicator counter Sa is decremented to 1 in block 313a.

In the next program execution, the microprocessor will proceed to block 307a. In this way, roughness indicator Sa is incremented each time wheel acceleration exceeds reference $Kvbr_1$ (=7) during a 0.5-second period and decremented each time the acceleration falls below $Kvbr_2$ (=8) during a 1-second period. The roughness indicator counter Sa is utilized to control wheel actuators 17 to 19 in subroutine 105 which will be described with reference to FIG. 10.

Figure 9:
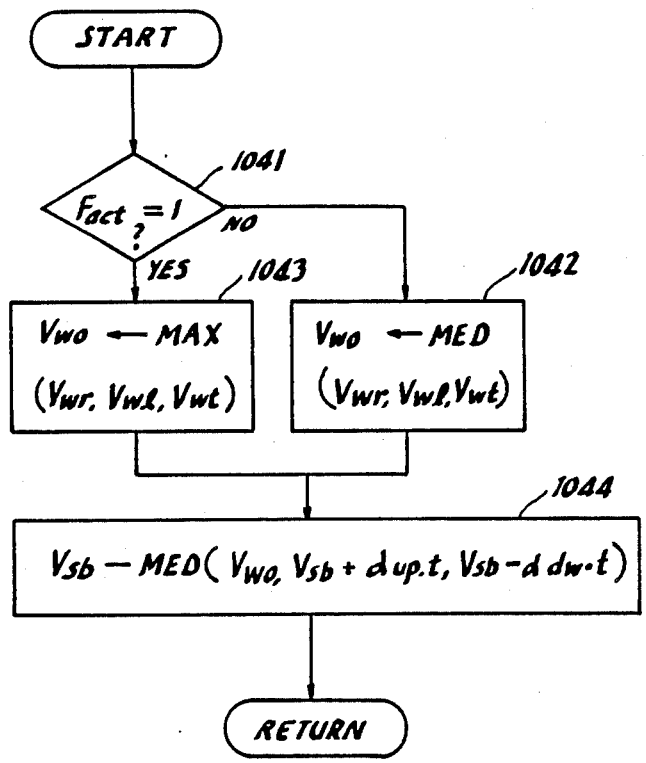
FIG. 9 is a flow diagram describing a vehicle speed determination subroutine of FIG. 5.

Prior to operating the actuators 17-19, vehicle speed Vsb is estimated on the basis of wheel speeds according to a program shown in FIG. 9 which commences with block 1041 which checks whether a go-ahead flag $F_{act}$ has been set up. If $F_{act}=0$, control is passed to block 1042 to derive a reference wheel speed value Vwo from a medium value of front-right, front-left and rear wheel speed values Vwr, Vwl, Vwt. If $F_{act}=1$, control is passed to block 1043 to derive the reference wheel speed Vwo from the maximum of these wheel speeds. In a subsequent block 1044, a previously derived vehicle speed value Vsb is trimmed by the amount of vehicle acceleration or deceleration and a medium value of the reference speed Vwo and the trimmed vehicle speeds is detected as an estimated value of current vehicle speed.

Figure 10:
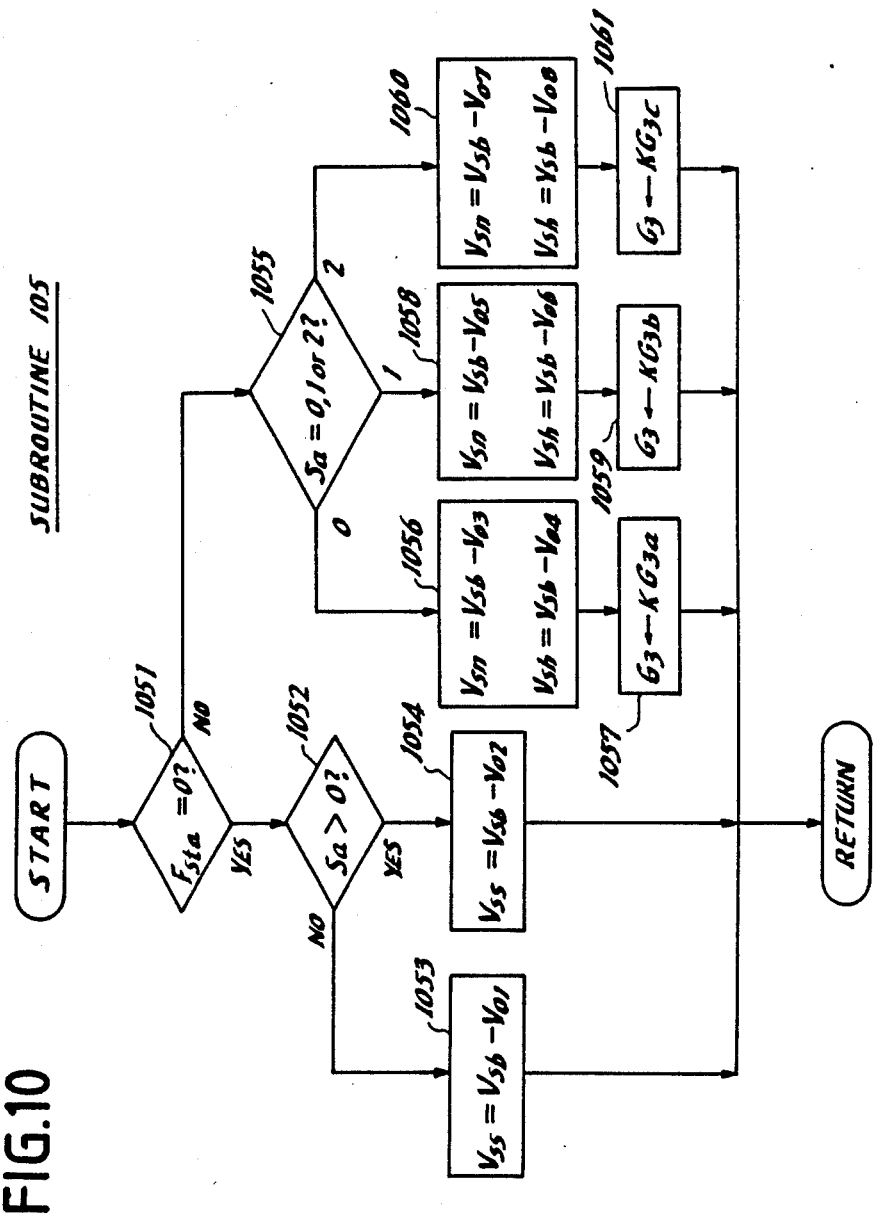
FIG. 10 is a flow diagram describing a reference derivation subroutine of FIG. 5.

The microprocessor now proceeds to block 1051 of subroutine 105, FIG. 10, to check for the status of start flag $F_{sta}$. During a pre-antiskid period, control is passed to block 1052 to check if Sa>0. If the road is smooth, Sa=0 and a "no" decision route is taken to block 1053 to set pre-control reference wheel speed Vss equal to Vsb-$V_{o1}$, where $V_{o1}$ is typically 5 km/h. If the road is of a low degree of roughness, Sa=1 and control is passed to block 1054 to set Vss equal to Vsb-$V_{o2}$, where $V_{o2}$ is typically 10 km/h. Therefore, the pre-control reference wheel speed Vss is decreased when Sa switches from 0 to 1 and vice versa as seen in FIG. 8a. The decrease in reference speed Vss is to prevent premature brake loosening action when a light brake is applied when running on a rough road.

During antiskid control, control is passed to block 1055 to check for the Sa value. If Sa=0, block 1056 is executed by setting a change-to-gradual down pressure threshold Vsn equal to Vsb-$V_{o3}$, where $V_{o3}$ is typically 1 km/h, and setting a change-to-rapid down pressure threshold Vsh equal to Vsb-$V_{o4}$, where $V_{o4}$ is typically 5 km/h. A wheel acceleration reference $G_3$, which will be described later together with $G_1$ and $G_2$, is set equal to $KG_{3a}$ which is typically +7 g (block 1057). Likewise, if Sa=1 in block 1055, change-to-gradual down pressure threshold Vsn is set equal to Vsn-$V_{o5}$, where $V_{o5}$ is typically 3 km/h (block 1058), and change-to-rapid down pressure threshold Vsh is set equal to Vsb-$V_{o6}$, where $V_{o6}$ is typically 7 km/h. Wheel acceleration reference $G_3$ is set equal to $KG_{3b}$ which is typically +5 g (block 1059). With Sa=2 in block 1055, change-to-gradual down pressure threshold Vsn is set equal to Vsn-$V_{o7}$, where $V_{o7}$ is typically 5 km/h (block 1060), and change-to-rapid down pressure threshold Vsh is set equal to Vsb-$V_{o8}$, where $V_{o8}$ is typically 10 km/h.

Wheel acceleration reference $G_3$ is set equal to $KG_{3c}$ which is typically +3 g (block 1061).

FIGS. 11a and 11b are illustrations of a timer interrupt subroutine which is executed at regular intervals during program execution of the main routine. The timer interrupt routine starts with block 201 in which wheel speed Vw is determined for each of the wheels. Wheel acceleration Aw is derived in block 202 by taking a difference between wheel speed values successively derived from each wheel. Details of the blocks 201 and 202 will be described later.

Control is now passed to block 203. If a go-ahead decision is not present, control is jumped to block 204 to deenergize actuators 17–19 so that they return to an inoperative state immediately following the go-ahead flag $F_{act}$ being reset. If $F_{act}=1$ in block 203, control is passed to block 205 to compare wheel speed and acceleration values Vw, Aw with reference values Vsn, Vsh, $G_1$, $G_2$ and $G_3$.

FIG. 11b illustrates the detail of block 205. In block 2051a, each wheel speed value Vw derived in step 201 is compared with change-to-gradual down pressure threshold Vsn. If Vw<Vsn, a change-to-gradual down pressure flag $f_{VSN}$ is set up in block 2051b and if Vw≧Vsn, flag $f_{VSN}$ is reset in block 2051c. The wheel speed value Vw is then compared in block 2052a with change-to-rapid down pressure threshold Vsh. If Vw<Vsh, a change-to-rapid down pressure flag $f_{VSH}$ is set up in block 2052b and if not, this flag is reset in block 2052c.

As will be understood later, the change-to-gradual down pressure flag $f_{VSN}$ is one determining factor to initiate a gradual down pressure control on hydraulic brakes and the change-to-rapid down pressure flag $f_{VSH}$ is also one determining factor to initiate a rapid down pressure brake control.

Each acceleration value Aw is compared successively with deceleration reference $G_1$ and acceleration references $G_2$ and $G_3$. Reference $G_1$ represents a deceleration value, typically −2 g, reference $G_2$ representing an acceleration value in the range between +0.5 g to +1.0 g and reference $G_3$ representing an acceleration value +6 g. Condition Aw>$G_1$ in block 2053a causes flag $f_{G1}$ to set up in block 2053b and condition Aw≦$G_1$ resets it in block 2053c. Condition Aw>$G_2$ in block 2054a causes flag $f_{G2}$ to set up in block 2054b and condition Aw≦$G_2$ resets it in block 2054c. Likewise, condition Aw>$G_3$ in block 2055a causes flag $f_{G3}$ to set up in block 2055b and condition Aw≦$G_3$ causes it to be reset in block 2055c.

Figure 13:
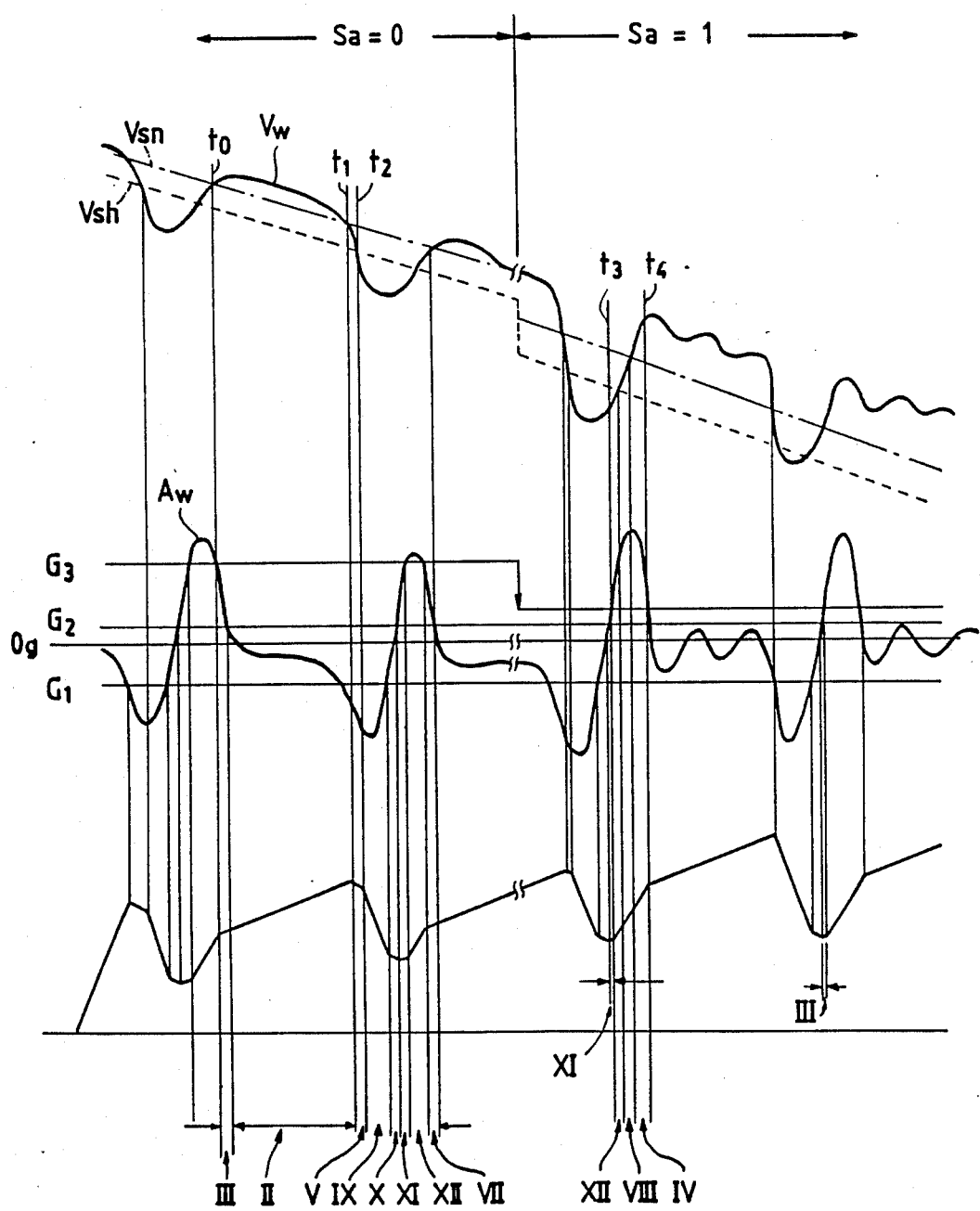
FIG. 13 is a graphic illustration useful for understanding the operation of the antiskid control system.

The flags $f_{VSN}$, $f_{VSH}$, $f_{G1}$, $f_{G2}$ and $f_{G3}$ are used in block 206 to select an operating mode of the pressure gradient control section 28 of each actuator to apply hydraulic pressure to brakes 9–12 with an appropriate gradient. FIG. 13 shows the pressure gradient patterns associated with the operating modes of actuators 17–19 which can be selected according to different combinations of the flags just mentioned. The ROM stores the solenoid operating modes in locations which are addressed as a function of the combination of binary status of these flags.

Control is then advanced to block 207 to check if a down-pressure mode is selected and if so, a down-pressure time counter $C_{dpt}$ is incremented by one in block 208, and if not this counter is reset in block 209.

In block 210, the microprocessor checks if down-pressure time counter $C_{dpt}$ exceeds a preset limit, typically 3 seconds, and if so, the actuators 17–19 are deenergized in block 204 and if not, control is passed to block 211 to detect if the selected mode is an up-pressure mode and if so, an up-pressure time counter $C_{upt}$ is incremented by one in block 212, and if not, this counter is reset in block 213. If the counter $C_{upt}$ indicates a 3-second period (block 214), actuators are deenergized, and if not, they remain energized.

The operation of the antiskid control will be better understood with reference to FIG. 13. Let it be assumed that roughness indicator Sa has changed from 0 to 1, i.e., from a smooth road surface to a low-degree rough road surface during antiskid mode. During the time prior to Sa being switched to 1, wheel acceleration Aw is compared with a higher value of reference $G_3$ which is set equal to KG3a (=7+g) and wheel speed value Vw is compared with higher values of change-to-gradual down pressure threshold Vsn (=Vsb−1 km/h) and change-to-rapid down pressure threshold Vsh (=Vsb −5 km/h).

During the interval between times $t_0$ and $t_1$ in which Vw is greater than Vsn and Aw is initially greater than $G_2$ and then reduces to a level between $G_2$ and $G_1$, mode III is initially selected in response to flags $f_{G2}=1$ and $f_{G1}=1$ and then mode II is selected in response to flag $f_{G1}=1$, so that brake pressure is on a gradual increase as seen in FIG. 13. At time $t_1$, Vw reduces below Vsn with Aw being lower than $G_1$, flag $f_{VSN}=1$ is established and mode V is selected to gradually decrease the brake pressure. When Vw reduces below Vsh at point $t_2$, flags $f_{VSN}=1$ and $f_{VSH}=1$ are established and mode IX is selected to rapidly decrease the brake pressure. Brake pressure is then switched to gradual down pressure mode X and gradual up pressure mode XI as Aw exceeds $G_1$ and $G_2$ in succession. Rapid up pressure mode XII is selected when Aw exceeds $G_3$ briefly, which is followed by mode VII by which brake pressure is gradually increased.

With the Sa value being switched to 1, reference $G_3$ is switched to a lower value $KG_{3b}$ (= +5 g) and references Vsn and Vsh are also switched to lower values Sb−3 km/h and Sb−7 km/h, respectively. The reduction of references Vsn and Vsh causes the antiskid system to respond with a reduced sensisitivity to rapidly varying wheel speeds. This serves to minimize the undesirable operation of actuators 17–19 resulting from vehicle vibration (known as "surface noise"). The reduction of reference $G_3$, on the other hand, causes the system to respond with an increased sensitivity to rapidly varying acceleration by decreasing the period of gradual up pressure modes XI and III and increasing the period of rapid pressure rise between times $t_3$ and $t_4$ as effected under modes XII, VIII and IV. It is seen therefore that the antiskid system as taught by the present invention ensures against excessive brake pressure reduction which would otherwise occur due to random fluctuation of wheel speeds when the vehicle encounters a rough surface road.

Figure 14:
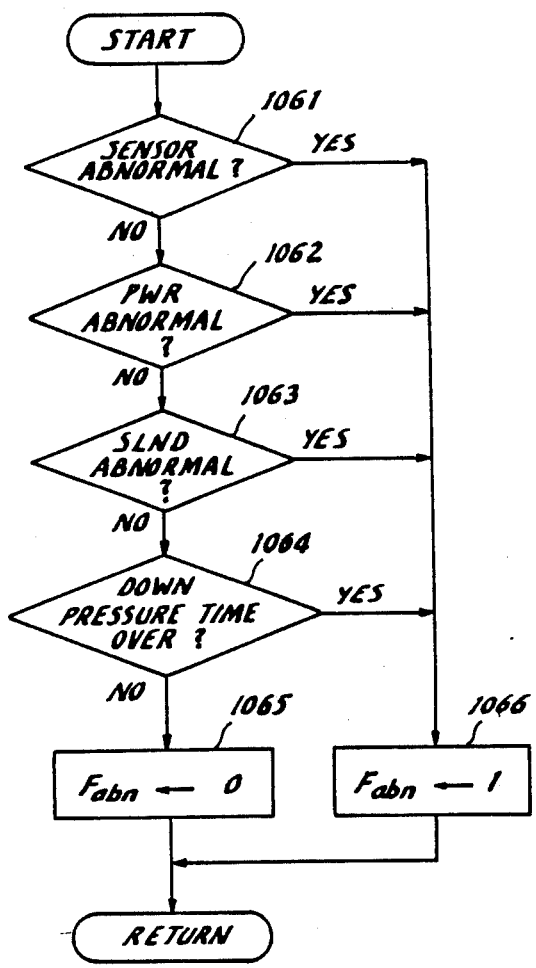
FIG. 14 is a flow diagram describing a system check subroutine of FIG. 5.

Returning to FIG. 5, subroutine 105 is followed by a system check subroutine 106 in which the microprocessor checks system functions for abnormal conditions. As shown in FIG. 14, the subroutine 106 comprises blocks 1061 to 1066. In block 1061, wheel speed sensors 5–7 are checked for abnormality such as disconnection and short-circuit condition. The source voltage of power circuit is checked in block 1062 for under- or over-voltage condition. Actuator solenoids are checked in block 1063 for disconnection and short-circuit and the down pressure operation is checked in block 1064 for abnormal prolongation. If all these functions are normal, control is passed to block 1065 to reset an abnormal flag $F_{abn}$, and if any abnormality is detected, abnormal flag $F_{abn}$ is set up in block 1066.

Figure 5:
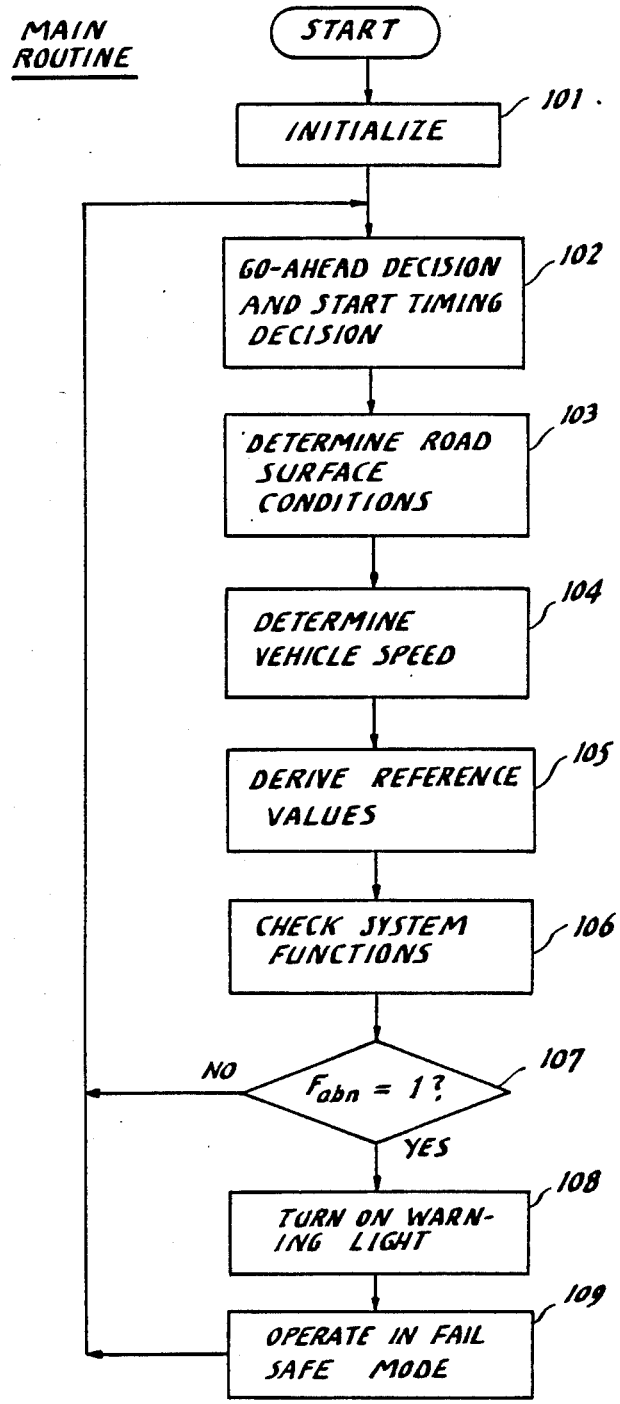
FIG. 5 is an illustration of a flow diagram describing a main routine executed by the microprocessor of FIG. 4.
Figure 6:
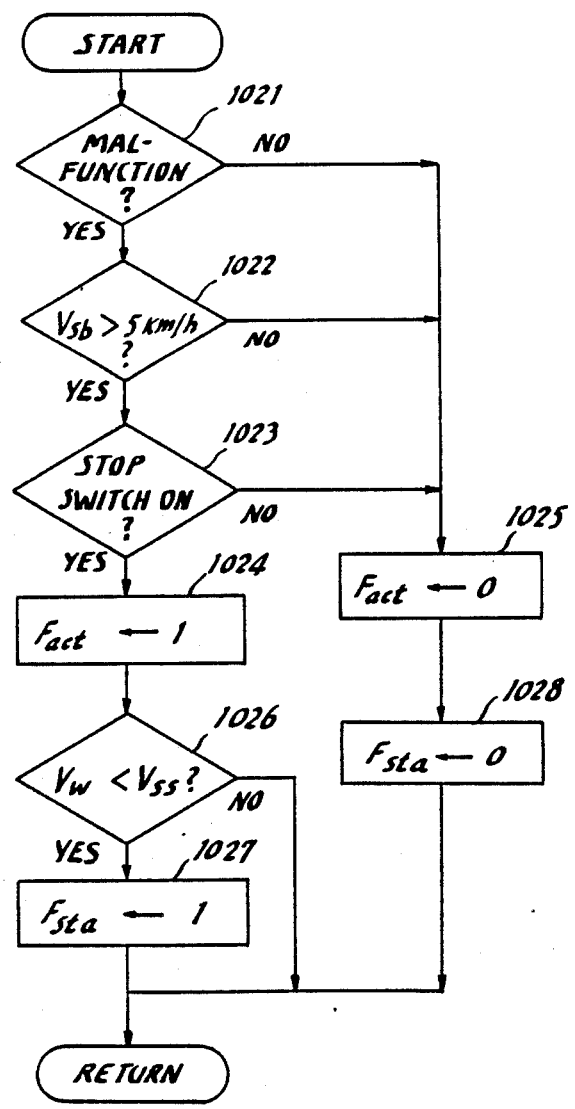
FIG. 6 is a flow diagram of the go-ahead and start timing decision subroutine of FIG. 5.

The microprocessor now proceeds to a step 107, FIG. 5, to check the status of abnormal flag $F_{abn}$. If $F_{abn}=0$, indicating that no abnormality is detected, control is jumped to subroutine 102 to repeat the executions described above, and if $F_{abn}$ 32 1, control is passed to a subroutine 108. A control signal is applied to indicator driver 40 which latches it and drives the warning light 25 to alert the vehicle occupant.

A fail-safe subroutine 109 is executed by energizing the cut-off relay 24 to cut off the circuits to the actuators 17-19. Thus, the system is allowed to operate in a manual mode in which the brake pressure is applied in response to the depression of the brake pedal in the usual manner. It is preferable that an arrangement be made to cut off the input circuits to actuator drivers 36-38 to ensure against the abnormality of cut-off relay 24.

Figure 15:
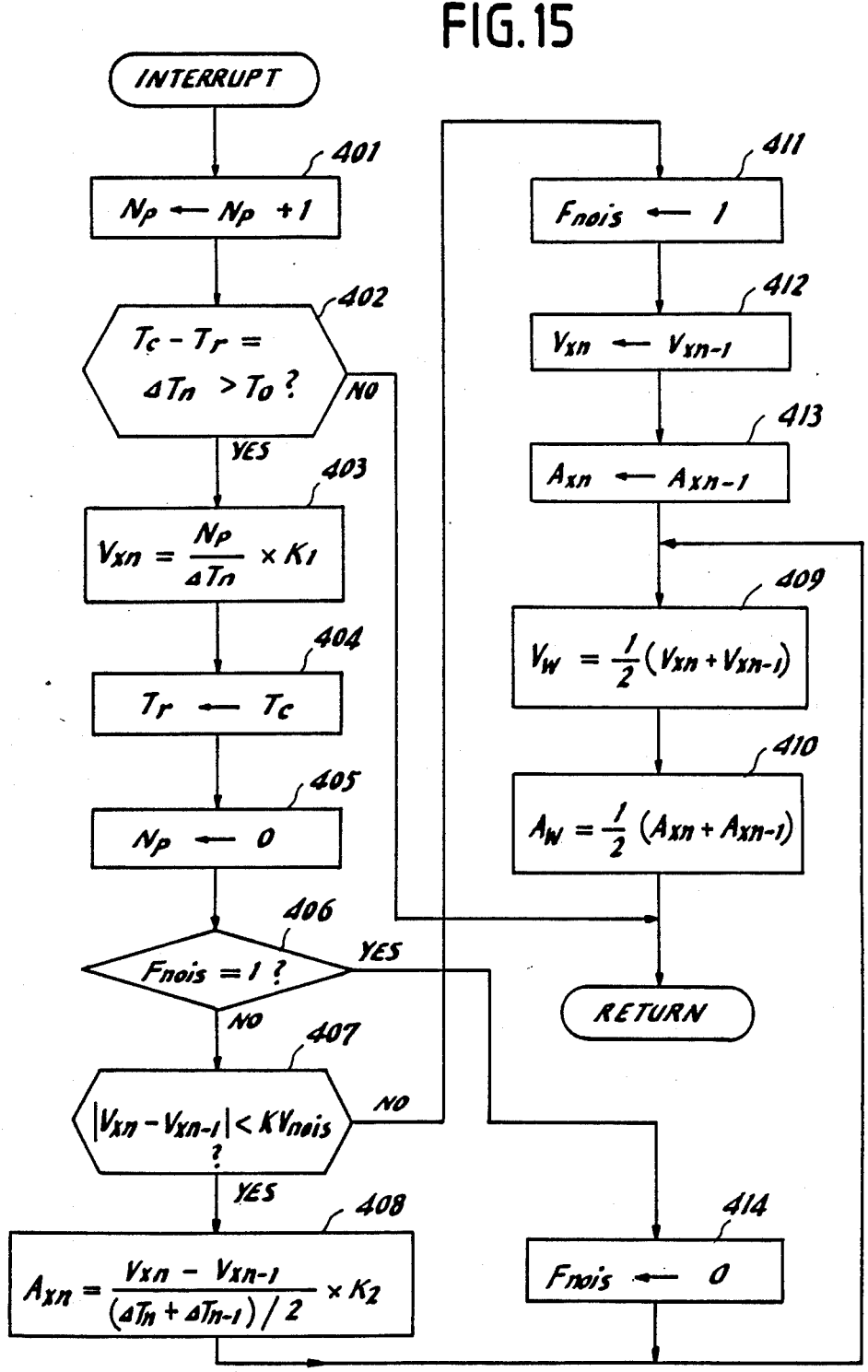
FIG. 15 is a flow diagram describing an interrupt routine in which average wheel speed and average wheel acceleration are derived according to the present invention.

According to the present invention, wheel speed Vw and wheel acceleration Aw are derived in an interrupt routine shown in FIG. 15.

Figure 16:
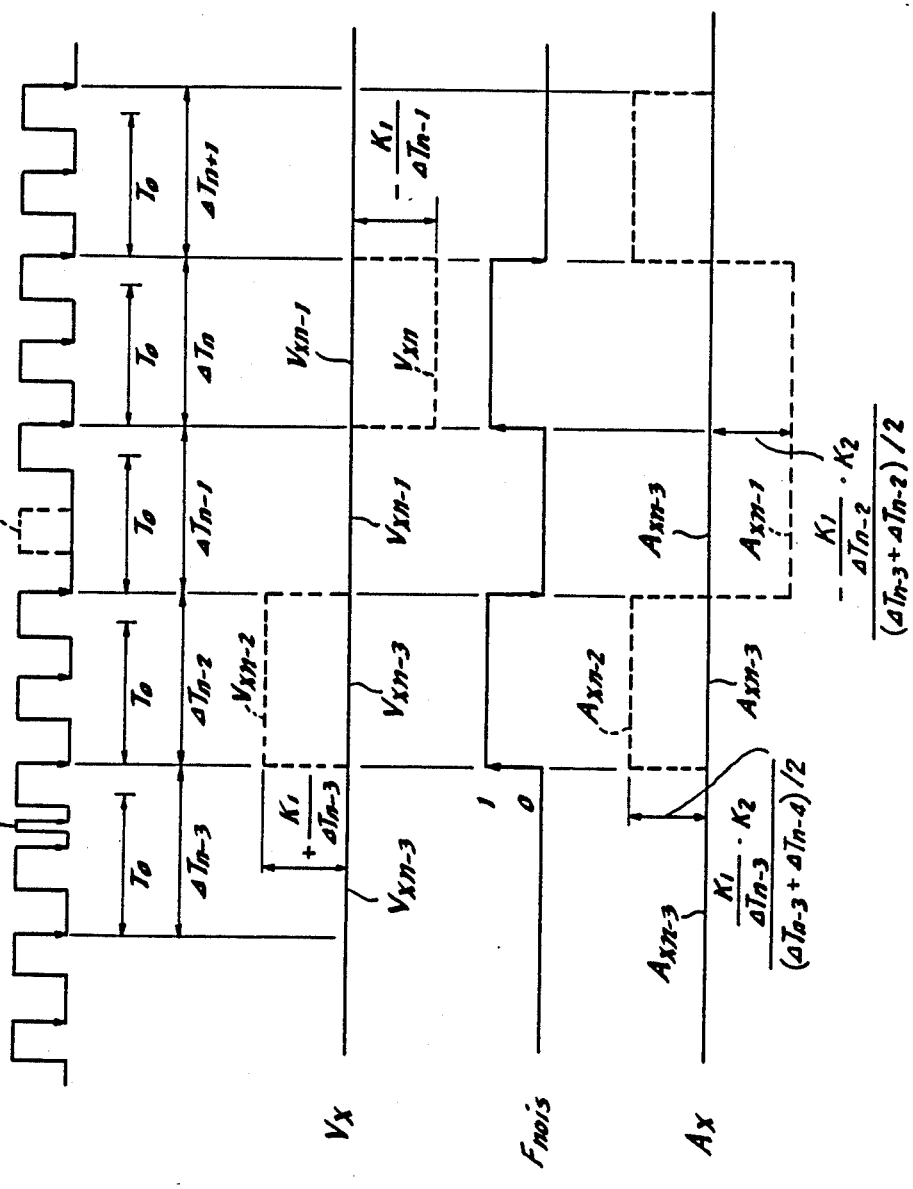
FIG. 16 is a timing diagram associated with FIG. 15.

The main routine is interrupted in response to the trailing edge of each wheel speed pulse from sensors 5, 6 and 7. Three interrupt routines are therefore provided, one for each wheel speed sensor with a different priority. The interrupt routine commences at block 401. A pulse count value Np is incremented by one upon arrival of each wheel speed pulse. Control is passed to block 402 to detect whether $\Delta T_n$ is greater than To, where $\Delta T_n$ represents the interval or "frame" between a reference time Tr and a current time Tc at which the main routine is interrupted. If this frame is smaller than To, control is returned to the main routine. As shown in FIG. 16, the period To is greater than one pulse spacing plus one pulse separation so that there are two wheel speed pulses for each $\Delta T_n$ frame. Upon the count of every two pulses, control arrives at block 403 to detect the instantaneous wheel speed value $Vx_n$ from Equation 1.

$$Vxn = Np \times K_1 / \Delta T_n \qquad (1)$$

Reference time value Tr is updated with current time value Tc (block 404) and pulse count value Np is cleared (block 405). A noise flag $F_{nois}$ is checked (block 406). If a noise impulse was introduced to the preceding frame, control is passed through block 406 to block 414 to reset the noise flag. If no impulse noise was present in the previous frame, control is passed through block 406 to block 407 in which the microprocessor detects the difference between the instantaneous wheel speed value ($Vx_n$) derived in the current interrupt routine and the instantaneous wheel speed value ($Vx_{n-1}$) derived in the immediately preceding interrupt routine and proceeds to check whether or not the absolute value of this difference is smaller than a predetermined noise discrimination threshold KVnois. This threshold represents a range of inherent speed variations which normally occur in closed loop control. A suitable value for this threshold is 10 km/h.

If this threshold is not exceeded, the microprocessor verifies that the pulse train is not disturbed and the derived instantaneous speed value is reliable and proceeds to block 408 to derive an instantaneous value of wheel acceleration $Ax_n$ from Equation 2 as given below.

$$Ax_n = \frac{Vx_n - Vx_{n-1}}{(\Delta T_n + \Delta T_{n-1})/2} \times K_2 \qquad (2)$$

The microprocessor proceeds to block 409 to derive an average wheel speed Vw over the period of two successive frames from Equation 3 below.

$$Vw = (Vx_n + Vx_{n-1})/2 \qquad (3)$$

Block 410 is then executed for deriving an average value of wheel acceleration over the same period from Equation 4, $$Aw = (Ax_n + Ax_{n-1})/2 \qquad (4)$$

where, $Ax_{n-1}$ represents the wheel acceleration obtained in the previous execution.

If the absolute value of the difference between $Vx_n$ and $Vx_{n-1}$ exceeds the noise threshold KVnois, the microprocessor interprets this as a noise impulse or pulse mutilation or loss, and the speed value $Vx_n$ obtained in block 403 is verified as unreliable (block 407). Control exits to block 411 to set up noise flag $F_{nois}$ and the previous value $Vx_{n-1}$ stored in RAM 35b is substituted for the current value $Vx_n$ (block 412). The previous wheel acceleration value $Ax_{n-1}$ is likewise substituted for the current acceleration value $Ax_n$ in block 413. Therefore, in subsequent blocks 409 and 410 the previous values $Vx_{n-1}$ and $Ax_{n-1}$ are used to derive average wheel speed value Vw and acceleration value Aw. In the next interrupt routine, the microprocessor detects $F_{nois}=1$ in block 406 and resets it in block 414 and then executes blocks 409 and 410.

Let it be assumed that a noise impulse has occurred within the period To of a frame $\Delta T_{n-3}$. This impulse is additionally counted in the next interrupt routine (block 401) and an instantaneous wheel speed value $Vx_{n-2}$ is derived in block 403 with the result that this value is greater than the actual instantaneous speed value Vx by an amount $K_1/\Delta T_{n-3}$ as indicated in FIG. 16. The value $Vx_{n-2}$ exceeds the noise discrimination threshold KVnois in block 407 and control is passed to block 411 to set up noise flag $F_{nois}$. Blocks 412 and 413 are executed successively to replace $Vx_{n-2}$ with $Vx_{n-3}$ and replace $Ax_{n-2}$, which would have otherwise been derived in block 408, with $Ax_{n-3}$. Thus, in blocks 409 and 410, $Vx_{n-3}$ and $Ax_{n-3}$ are used in the calculations, so that Vw and Aw become $Vx_{n-3}$ and $Ax_{n-3}$, respectively. Assume that if block 408 is not skipped, the instantaneous acceleration $Ax_{n-2}$ would have a value greater than the true acceleration Ax by an amount equal to $$\frac{K_1 \cdot K_2/\Delta T_{n-3}}{(\Delta T_{n-3} + \Delta T_{n-4})/2}$$

and the next acceleration value $Ax_{n-1}$ would decrease by an amount equal to:

$$\frac{K_1 \cdot K_2/\Delta T_{n-2}}{(\Delta T_{n-3} + \Delta T_{n-2})/2}$$

In the next frame $\Delta T_{n-1}$, block 403 is executed to derive $Vx_{n-1}$ and flag $F_{nois}=1$ is detected in block 406 and control is passed to block 414 and thence to block 409 to calculate $Vw=(\frac{1}{2})(Vx_{n-1}+Vx_{n-3})$. Since block 408 has been skipped twice, i.e., in frames $\Delta T_{n-2}$ and $\Delta T_{n-1}$, the value $Ax_{n-3}$ is used in the calculation in block 410, so that $Ax_{n-3}$ is again derived in this block.

Assume that a pulse is lost within the period To of frame $\Delta T_{n-1}$. This results in the instantaneous speed $Vx_n$ of the next frame $T_n$ having a value smaller than Vx by an amount $K_1/\Delta T_{n-1}$. A similar process is repeated, replacing the $Vx_n$ in error with the previous value $Vx_{n-1}$.

It is noted that the occurrence of a noise impulse (not shown) immediately following the period To of frame $\Delta T_{n-3}$ would result in a deviation in the range between $K_1/\Delta T_{n-3}$ and zero in the speed value $Vx_{n-2}$ which might exceed the noise threshold. Similarly, a pulse mutilation that occurs immediately following the period To of that frame results in a reduction in wheel speed Vx which ranges between $K/(\Delta T_{n-1}+Tp)$ and $K/(\Delta T_{n-1}+2Tp)$, where Tp represents the pulse separation.

Because of the fact that pulse signals from the wheel speed sensors tend to be increasingly affected by noise and mutilation as the degree of road surface roughness increases, the antiskid control system incorporating the wheel speed and acceleration detector of the invention ensures reliable compensation of road surface roughness.

In summary, the apparatus of the invention for detecting the average speed and average acceleration of a vehicle wheel, comprises, as shown in FIG. 17, a pulse generating means 50 for generating a pulse signal with a frequency proportional to the speed of rotation of the vehicle wheel. The pulse signal comprises a plurality of frames each having a series of a predetermined number of pulses which are tended to be affected by disturbance. Counter means 51 is provided for counting the pulses of the pulse signal and successively generating wheel speed signals each being indicative of an instantaneous value of said speed. A memory means 52 having first and second storage locations is provided for respectively storing preceding and following ones of the wheel speed signals. A differential means 53 detects the difference between the preceding and following wheel speed signals and applies a difference signal to a comparator means 54 for comparing the difference signal with a predetermined threshold and generating a first comparator output when the difference signal is lower than the threshold and a second comparator output when the difference signal is higher than the threshold. A control circuit 55 disables the following wheel speed signal in response to the second comparator output and rewrites the preceding signal into the second storage location in to the second comparator output. An output circuit 56 derives output signals representing the average wheel speed and average wheel acceleration from the speed signals in the first and second storage locations of the memory means 52.

What is claimed is:

1. Apparatus for detecting the average speed and average acceleration of a vehicle wheel, comprising:
   pulse generating means for generating a pulse signal with a frequency proportional to the speed of rotation of the vehicle wheel, said pulse signal comprising a plurality of frames each having a series of a predetermined number of pulses which are affected by disturbance;
   counter means for counting the pulses of said pulse signal and successively generating wheel speed signals each being indicative of an instantaneous value of said speed;
   memory means having first and second storage locations for respectively storing therein preceding and following ones of said wheel speed signals, and third and fourth storage locations for respectively storing therein preceding and following ones of wheel acceleration signals;
   means for successively deriving said wheel acceleration signals from the wheel speed signals stored in said first and second storage locations;
   differential means for detecting a difference between the signals stored in said first and second storage locations;
   comparator means for comparing said difference with a predetermined threshold and generating a comparator output when said difference is greater than said threshold;
   means responsive to said comparator output for disabling the following wheel speed signal and rewriting into said second storage location the preceding wheel speed signal stored in said first storage location and further disabling said following wheel acceleration signal and rewriting said fourth storage location with the preceding wheel acceleration signal stored in said third storage location; and
   means for deriving said average wheel speed from the wheel speed signals stored in said first and second storage locations of said memory means, and for deriving said average wheel acceleration from the wheel acceleration signals stored in said third and fourth storage locations.

2. Apparatus for detecting the average speeds and average acceleration of a vehicle wheel, comprising:
   pulse generating means for generating a pulse signal with a frequency proportional to the speed of rotation of the vehicle wheel, said pulse signal comprising a plurality of frames each having a series of a predetermined number of pulses which are affected by disturbance;
   memory means having first, second, third and fourth storage locations; and
   data processing means responsive to the pulses in each frame of said pulse signal for successively generating wheel speed signals each being indicative of an instantaneous value of said speed, storing a preceding one of said wheel speed signals into the first storage location of said memory means and storing a following one of said wheel speed signals into said second location of said memory means, successively deriving wheel acceleration signals from the wheel speed signals stored in said first and second storage locations, storing preceding and following ones of the successively derived wheel acceleration signals into said third and fourth storage locations, respectively, detecting a difference between the successively generated wheel speed signals, detecting when said difference is greater than a predetermined threshold, rewriting the following wheel speed signal with the preceding wheel speed signal when said difference is detected as being greater than said threshold, and deriving said average wheel speed from the signals stored in said first and second storage locations and deriving said average wheel acceleration from the signals stored in said third and fourth storage locations.

3. Apparatus for detecting the average speed and average acceleration of a vehicle wheel, comprising:

pulse generating means for generating a pulse signal with a frequency proportional to the speed of rotation of a vehicle wheel, said pulse signal comprising a plurality of frames of variable length, each frame having a series of a predetermined number of pulses which are affected by disturbance;

a memory having first, second, third and fourth storage locations; and data processing means which is programmed to execute the following steps:
- (a) detecting the length of each of said frames;
- (b) counting the pulses in each of said frames to provide a count value;
- (c) successively deriving instantaneous speed values from said count value and the detected lengths of successive ones of said frames and storing preceding and following ones of the instantaneous values respectively into said first and second storage locations of said memory;
- (d) detecting a difference between the instantaneous values stored in said first and second storage locations;
- (e) comparing said difference with a predetermined threshold and generating a comparator output when said difference is greater than said threshold
- (f) successively deriving wheel acceleration signals from the signals stored in said first and second storage locations and storing preceding and following ones of said successively derived wheel acceleration signals into said third and fourth storage locations, respectively;
- (g) deriving said average wheel speed from the instantaneous value stored in said first and second storage locations, and deriving said average wheel acceleration from the signals stored in said third and fourth storage locations;
- (h) replacing the instantaneous value stored in said second storage location with the instantaneous value stored in said first storage location in response to said comparator output; and
- (i) replacing the signal stored in said fourth storage location with the signal stored in said third storage location in response to said comparator output;
- (j) repeating the steps (a) to (i).

4. A method for detecting the average speed and average acceleration of a vehicle wheel, comprising:
- (a) generating a pulse signal with a frequency proportional to the speed of rotation of a vehicle wheel, said pulse signal comprising a plurality of frames of variable length, each frame having a series of a predetermined number of pulses which are affected by disturbance;
- (b) detecting the length of each of said frames;
- (c) counting the pulses in each of said frames to provide a count value;
- (d) successively deriving instantaneous speed values from said count value and the detected lengths of successive ones of said frames and storing preceding and following ones of the instantaneous values respectively into first and second memory locations;
- (e) detecting a difference between the instantaneous values stored in said first and second memory locations;
- (f) comparing said difference with a predetermined threshold and generating an output when said difference is greater than said threshold;
- (g) successively deriving wheel acceleration signals from the signals stored in said first and second memory locations and storing preceding and following ones of said successively derived wheel acceleration signals into third and fourth memory locations, respectively;
- (h) deriving said average wheel speed from the instantaneous values stored in said first and second memory locations and deriving said average wheel acceleration from the signals stored in said third and fourth memory locations;
- (i) replacing the instantaneous value stored in said second memory location with the instantaneous value stored in said first memory location in response to the output of the step (f); and
- (j) replacing the signal stored in said fourth memory location with the signal stored in said third memory location in response to the output of the step (f).

* * * * *